United States Patent
Rafferty et al.

(10) Patent No.: US 12,331,767 B2
(45) Date of Patent: Jun. 17, 2025

(54) ADJUSTABLE FLOW CONTROL SYSTEMS

(71) Applicant: The Boeing Company, Chicago, IL (US)

(72) Inventors: Bradley Jerome Rafferty, St. Louis, MO (US); Rene Woszidlo, Lawrence, KS (US)

(73) Assignee: The Boeing Company, Arlington, VA (US)

( * ) Notice: Subject to any disclaimer, the term of this patent is extended or adjusted under 35 U.S.C. 154(b) by 409 days.

(21) Appl. No.: 17/823,700

(22) Filed: Aug. 31, 2022

(65) Prior Publication Data

US 2024/0068495 A1   Feb. 29, 2024

(51) Int. Cl.
*F15D 1/12* (2006.01)
*B64C 21/08* (2023.01)
*F15D 1/00* (2006.01)

(52) U.S. Cl.
CPC .............. *F15D 1/12* (2013.01); *B64C 21/08* (2013.01); *F15D 1/00* (2013.01); *F15D 1/008* (2013.01)

(58) Field of Classification Search
CPC ............ F15D 1/12; F15D 1/008; B64C 21/08
See application file for complete search history.

(56) References Cited

U.S. PATENT DOCUMENTS

| | | | |
|---|---|---|---|
| 10,082,243 B1* | 9/2018 | Hagshenas | F02C 7/047 |
| 11,347,204 B2 | 5/2022 | Rafferty | |
| 2020/0102066 A1* | 4/2020 | Stefes | B64C 9/00 |
| 2021/0223758 A1* | 7/2021 | Rafferty | F15C 3/16 |

OTHER PUBLICATIONS

Arvin Shmilovich et al."A Technique for Low Input Flow Control Actuation", American Institute of Aeronautics and Astronautics, Jun. 5-9, 2017, 16 Pages, Denver, CO.

* cited by examiner

*Primary Examiner* — Christopher D Hutchens
*Assistant Examiner* — Steven J Shur
(74) *Attorney, Agent, or Firm* — Hanley, Flight & Zimmerman, LLC (57) ABSTRACT

An adjustable flow control system includes a fluid source, a mass-flux device and a controller. The fluid source is configured to generate a fluid flow. The mass-flux device has an inlet to receive the fluid flow. The fluid flow is transferred from the inlet to an outlet that has an exit area with a variable geometry. The controller is configured to calculate a particular exit area of the mass-flux device to achieve a flow performance metric, calculate a fluid property of the fluid flow to produce the flow performance metric based on the particular exit area, determine if the fluid source could generate the fluid flow to match the fluid property, and control the variable geometry of the exit area to establish the particular exit area in response to the fluid source being able to generate the fluid flow to match the fluid property.

20 Claims, 6 Drawing Sheets

_Fig-7_

_Fig-9_

ADJUSTABLE FLOW CONTROL SYSTEMS

TECHNICAL FIELD

The disclosure relates generally to fluid flow near a control surface, and in particular, to adjustable flow control systems.

BACKGROUND

At given freestream conditions, existing air flow control solutions modulate fluid source properties supplied to mass-flux devices. A capacity to output momentum (a product of mass flow rate and velocity) effectively and thereby affect the aerodynamics of a vehicle is limited by a capacity of the fluid source. Depending on the flight condition, the fluid source may have a high availability for the pressure but a low availability of the mass flow rate. Such characteristics are troublesome if the air flow control system is oversized compared to a current operating point because the oversized system will provide a higher mass flow rate but at a lower velocity, relative to a system properly sized system for that operating point. Alternatively, some systems may trade mass flow rate with pressure and thereby a higher velocity; in other words, operate the system at a higher pressure and a lower mass flow rate. However, such an option may be impractical for the current state-of-the-art flow control systems, since the system sizing is fixed and the mass flow rate and pressure characteristics are determined by the fixed geometries.

Accordingly, those skilled in the art continue with research and development efforts in the field of adjustable flow control systems.

SUMMARY

An adjustable flow control system is provided herein. The adjustable flow control system includes a fluid source, a mass-flux device and a controller. The fluid source is configured to generate a fluid flow. The mass-flux device has an inlet and an outlet. The inlet is in fluid communication with the fluid source to receive the fluid flow. The fluid flow is transferred from the inlet to the outlet. The outlet has an exit area with a variable geometry. The controller is configured to calculate a particular exit area of the mass-flux device to achieve a flow performance metric, calculate a fluid property of the fluid flow to produce the flow performance metric based on the particular exit area, determine if the fluid source could generate the fluid flow to match the fluid property based on the particular exit area, and control the variable geometry of the exit area of the mass-flux device to establish the particular exit area as calculated in response to the fluid source being able to generate the fluid flow to match the fluid property as calculated.

In one or more embodiments of the adjustable flow control system, the controller is further configured to control the fluid source to produce the fluid flow with the fluid property as calculated.

In one or more embodiments of the adjustable flow control system, the fluid flow from the fluid source to the mass-flux device is reduced to approximately a minimum flow while the mass-flux device operates at the particular exit area to produce the flow performance metric.

In one or more embodiments of the adjustable flow control system, the controller is further configured to control the fluid source to adjust one or more of a pressure and a mass flow rate of the fluid flow to produce the flow performance metric.

In one or more embodiments, the adjustable flow control system includes a plurality of sensors configured to measure a plurality of operating conditions.

In one or more embodiments of the adjustable flow control system, the controller is further configured to determine the flow performance metric repeatedly in time to account for one or more changes in the plurality of operating conditions, and update the variable geometry of the exit area of the mass-flux device in response to the one or more changes in the plurality of operating conditions.

In one or more embodiments of the adjustable flow control system, the controller is further configured to iterate the variable geometry of the exit area of the mass-flux device in response to the fluid source being unable to generate the fluid flow to match the fluid property based on the particular exit area.

In one or more embodiments of the adjustable flow control system, the flow performance metric is a target momentum ratio of (i) a variable momentum of the fluid flow presented from the outlet of the mass-flux device to (ii) a freestream momentum of a freestream flow proximate the mass-flux device.

In one or more embodiments of the adjustable flow control system, the mass-flux device is a plurality of mass-flux devices with a plurality of exit areas, the plurality of exit areas form a total exit area, and the control of the variable geometry is a combined control of the total exit area.

In one or more embodiments of the adjustable flow control system, the combined control of the total exit area changes the plurality of exit areas to a plurality of different exit areas.

A method for adjustable flow control is provided herein. The method includes generating a fluid flow with a fluid source, and transferring the fluid flow from an inlet to an outlet of a mass-flux device. The outlet has an exit area with a variable geometry. The method includes calculating a particular exit area of the mass-flux device to achieve a flow performance metric, calculating a fluid property of the fluid flow to produce the flow performance metric based on the particular exit area, determining if the fluid source could generate the fluid flow to match the fluid property based on the particular exit area, and controlling the variable geometry of the exit area of the mass-flux device to establish the particular exit area as calculated in response to the fluid source being able to generate the fluid flow to match the fluid property as calculated.

In one or more embodiments, the method includes controlling the fluid source to produce the fluid flow with the fluid property as calculated.

In one or more embodiments, the method includes reducing the fluid flow from the fluid source to the mass-flux device to approximately a minimum flow while the mass-flux device operates at the particular exit area to produce the flow performance metric.

In one or more embodiments, the method includes controlling the fluid source to adjust one or more of a pressure and a mass flow rate of the fluid flow to produce the flow performance metric.

In one or more embodiments, the method includes measuring a plurality of operating conditions with a plurality of sensors.

In one or more embodiments, the method includes determining the flow performance metric repeatedly in time to account for one or more changes in the plurality of operating conditions, and updating the variable geometry of the exit area of the mass-flux device in response to the one or more changes in the plurality of operating conditions.

In one or more embodiments, the method includes iterating the variable geometry of the exit area of the mass-flux device in response to the fluid source being unable to generate the fluid flow to match the fluid property based on the particular exit area.

In one or more embodiments of the method, the flow performance metric is a target momentum ratio of (i) a variable momentum of the fluid flow presented from the outlet of the mass-flux device to (ii) a freestream momentum of a freestream flow proximate the mass-flux device. In one or more embodiments of the method, the mass-flux device is a plurality of mass-flux devices with a plurality of exit areas, the plurality of exit areas form a total exit area, and the controlling of the variable geometry is a combined controlling of the total exit area.

An aircraft is provided herein. The aircraft includes a flight control surface, a plurality of sensors, a fluid source, a mass-flux device, and a controller. The plurality of sensors is configured to measure a plurality of operating conditions of the aircraft. The fluid source is configured to generate a fluid flow. The mass-flux device has an inlet and an outlet. The inlet is in fluid communication with the fluid source to receive the fluid flow. The fluid flow is transferred from the inlet to the outlet. The outlet has an exit area with a variable geometry disposed proximate the flight control surface. The controller is configured to calculate a particular exit area of the mass-flux device to achieve a flow performance metric in response to the plurality of operating conditions, calculate a fluid property of the fluid flow to produce the flow performance metric based on the particular exit area, determine if the fluid source could generate the fluid flow to match the fluid property based on the particular exit area, and control the variable geometry of the exit area of the mass-flux device to establish the particular exit area as calculated in response to the fluid source being able to generate the fluid flow to match the fluid property as calculated.

The above features and advantages, and other features and advantages of the present disclosure are readily apparent from the following detailed description of the best modes for carrying out the disclosure when taken in connection with the accompanying drawings.

DETAILED DESCRIPTION

Embodiments of the present disclosure include a system and/or a method that applies a fluid flow from a mass-flux device to adjust a performance of a control surface. The system provides a mass-flux-based active flow control system that may modulate a momentum output in order to maintain a high-flow efficiency. The system alters a reference area of variable-geometry mass flux devices based on feedback data from flight conditions and system operation in order to maintain a target momentum ratio as efficiently as practical. Experimental and empirical data have shown that a flow control system designed for one operating point (a certain flight condition and fluid source supply condition— an "on-design" point) may suffer from loss in efficiencies (e.g., higher mass flow rate to achieve a different momentum ratio) when operating at off-nominal conditions ("off-design" points). The mass flux devices (e.g., converging-diverging nozzles, microjets, fluidic oscillators) are mechanized and automatically controlled to permit real-time geometric changes to the size of singular devices or to change a number of mass-flux devices in an array in order to change a total reference area and thereby more effectively deliver a target momentum as governed by gas dynamics laws. The reference area of the active flow control mass-flux devices may be modulated in real time per feedback control based on flight condition and target system performance such that the input flow criteria are optimized (relative to system availability) to achieve a target momentum output of the flow control system over common flight conditions.

Figure 1:
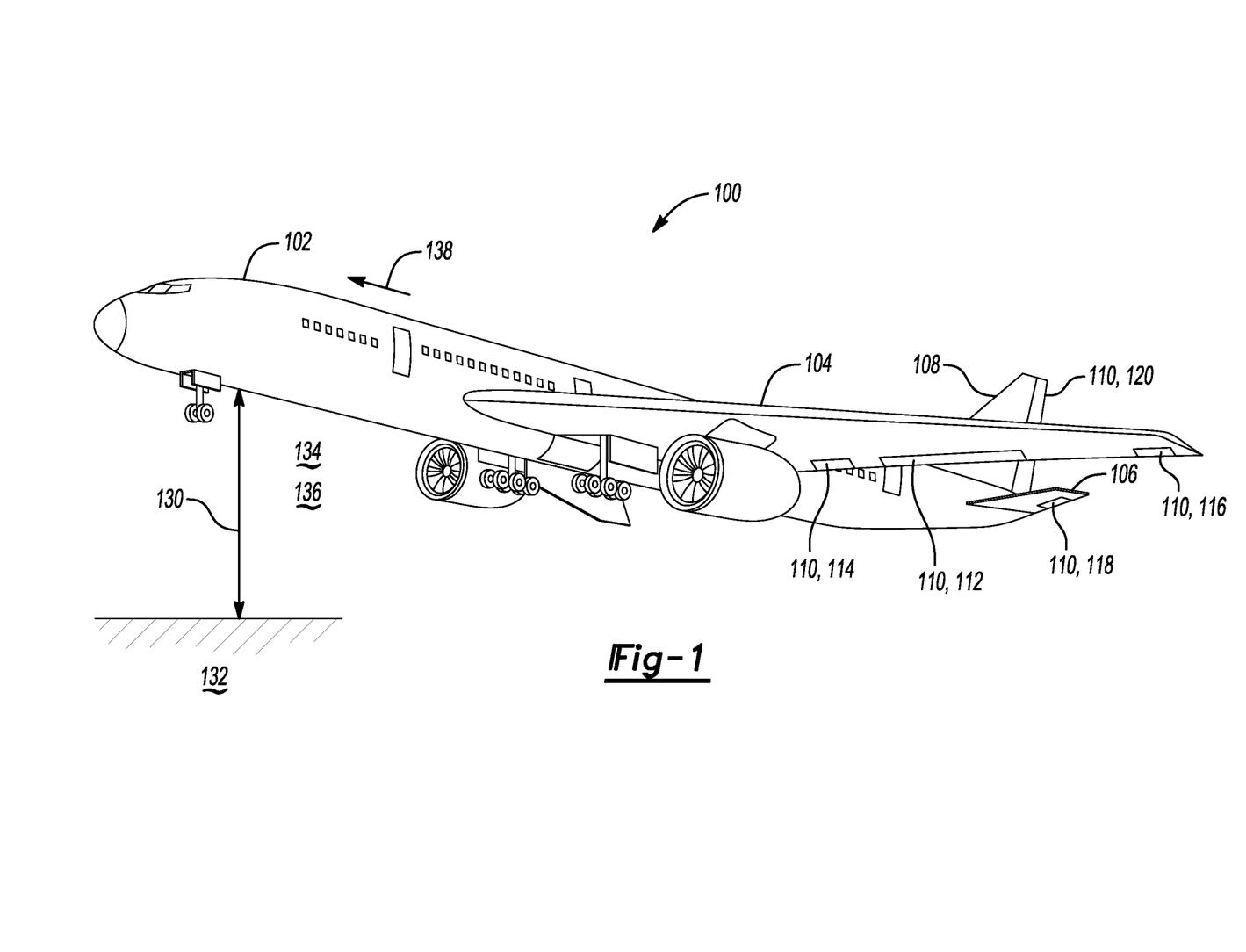
FIG. 1 is an isometric view diagram of an aircraft in accordance with one or more exemplary embodiments.

Referring to FIG. 1, an isometric view diagram of an example aircraft 100 is shown in accordance with one or more exemplary embodiments. The aircraft 100 includes a fuselage 102, multiple wings 104 (e.g., fixed wings), a horizontal stabilizer 106, a vertical stabilizer 108, and multiple control surfaces 110. The control surfaces 110 may include multiple flaps 112, multiple flaperons 114, multiple ailerons 116, multiple elevators 118, and a rudder 120.

The control surfaces 110 may be displaced or adjusted (e.g., deflected, etc.) to provide lift during takeoff, landing and/or flight maneuvers. To control flight of the aircraft 100, the control surfaces 110 mounted to the wings 104 alter the lift and pitch of the aircraft 100. According to examples disclosed herein, during flight of the aircraft 100 and/or movement of the control surfaces 110, jets 122 may be emitted, for example, from the flaps 112. In particular, the jets 122 affect aerodynamic properties of the aircraft 100 (e.g., reducing a drag coefficient of the aircraft 100). However, the examples disclosed herein may be applied to any other appropriate vehicle, body and/or application including, but not limited to, mixing (e.g., fuel mixing, combustion mixing, a fire extinguisher, etc.), cooling, heat transfer, fluid distribution, flow control, a heat exchanger, and the like. Generation and control of the jets 122 may be based on an altitude 130 of the aircraft 100 above the ground 132, an air pressure 134, an air temperature 136, and a freestream flight Mach number 138 of the aircraft 100.

Figure 2:
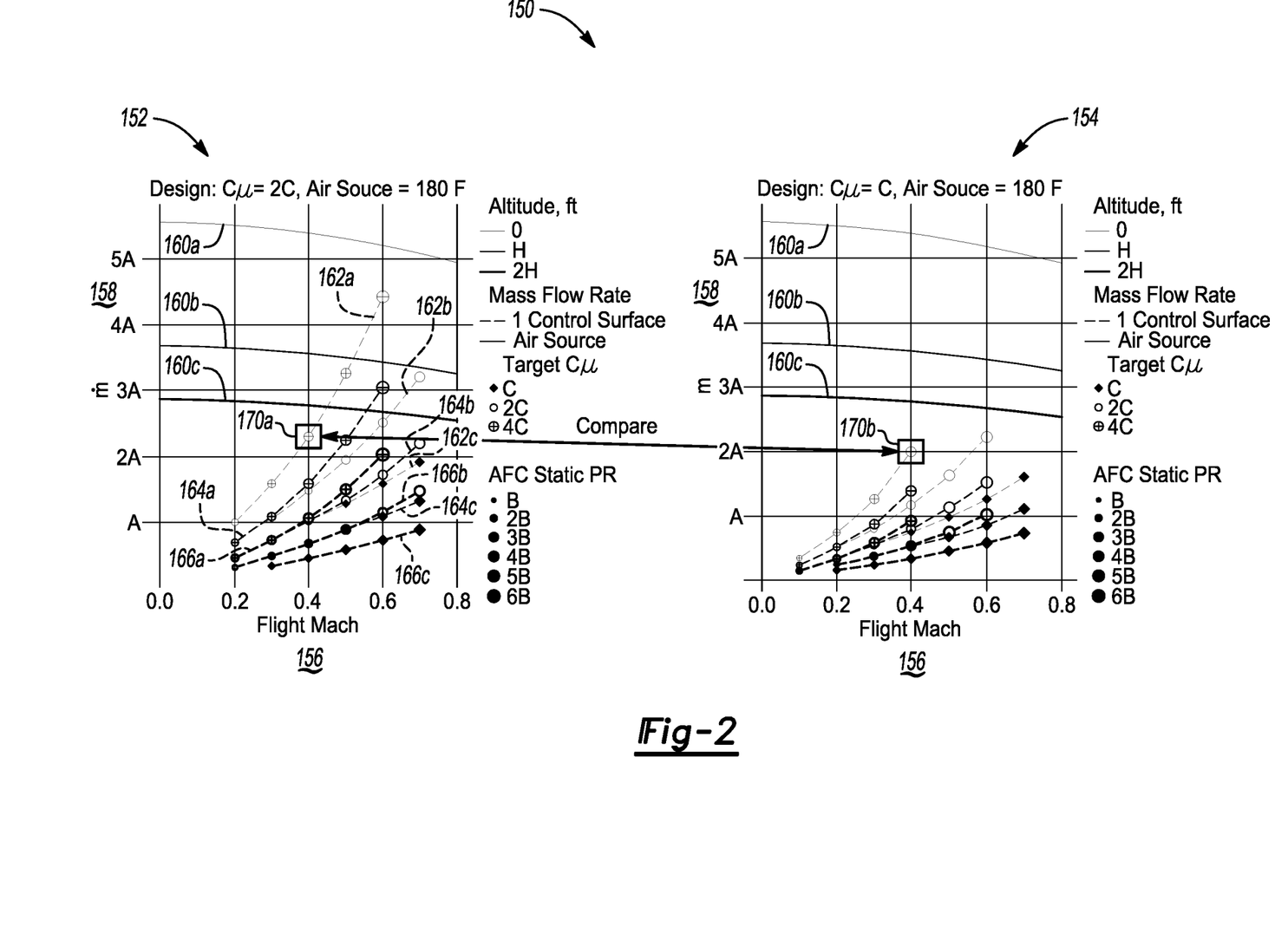
FIG. 2 is a diagram of a comparison of two different sized mass-flux devices in accordance with one or more exemplary embodiments.

Referring to FIG. 2, a diagram 150 of an example comparison of two different sized mass-flux devices is shown in accordance with one or more exemplary embodiments. A left side of the diagram 150 illustrates a graph 152 of a relatively larger mass-flux-device sizing operating at various flight conditions (e.g., various altitudes, which are linked to the air pressure 134, and the freestream flight Mach number 138) and actuating to various target momentum ratios. A right side of the diagram 150 illustrates a graph 154 of a relatively smaller mass-flux-device-sizing while operating at the various flight conditions and actuating to the various target momentum ratios. An x-axis 156 of each graph 152 and 154 represents a flight Mach range. A y-axis 158 of each graph 152 and 154 represents a mass-flow rate range.

Lines 160a-160c represent the altitude at ground level, an altitude (or height) H (e.g., 10,000 feet) and another altitude 2H (e.g., 20,000 feet), respectively. Lines 162a-162c represent first target mass flow rates at ground level on the y-axis 158. Dashed lines are mass flow rates through the flow control system to actuate over an aerodynamic control surface, and solid lines are the mass flow rates available from an auxiliary power unit—both at a given flight Mach number. Additional lines 164a-164c represent second target mass flow rates at the H altitude. Lines 166a-166c represent third target mass flow rages at the 2H altitude.

The marker symbol represents different target momentum ratios. A size of each marker symbol represents the static pressure ratio across the auxiliary power unit to supply the adjustable flight control system. The graph 152 (left) shows a system designed to supply a target momentum ratio of 2 C (e.g., 0.010) at an air source outlet temperature of 180 degrees Fahrenheit at the 2H altitude and a flight Mach 0.7 (a larger mass-flux-device reference area). The graph 154 (right) shows a system designed to supply a target momentum ratio of C (e.g., 0.005) at an air source outlet temperature of 180 degrees Fahrenheit at the 2H altitude and the flight Mach 0.7 (a smaller device reference area).

A comparison of the points between the two graphs 152 and 154 of the same flight Mach and the same target momentum ratio shows the larger device sizing (left graph 152) utilizes a larger mass flow rate but a smaller pressure ratio to achieve the same target momentum ratio. The smaller device sizing (right graph 154) utilizes a lower mass flow rate but at a higher pressure ratio. The comparison also shows that the larger device sizing (left graph 152) could achieve more flight-Mach-target-momentum-ratio combinations relative to the smaller device sizing (right graph 154). As an example, two comparable points 170a and 170b between the two graphs 152 and 154 are highlighted with squares and an arrow pointing between the two. The point 170a on the left graph 152 utilizes a higher mass flow rate (higher on the y-axis) and a lower pressure ratio (smaller marker size), while the opposite is true for the point 170b on the right graph 154. Both are operating at the same target momentum ratio and flight Mach.

Active flow control may improve overall aerodynamic performance with a net benefit to vehicle-level operation. Examples of active flow control applications include, but are not limited to, rotorcraft download reduction, high-lift improvement, and use as 'virtual' control surfaces. For the purpose of convenience for the disclosure, the term 'flight conditions' is meant to encompass freestream conditions (e.g., flight Mach number, freestream temperature, and freestream pressure) and pressurized fluid source conditions (e.g., pressure available, mass flow rate available, and fluid temperature). The mass-flux-based active flow control targets a momentum input into a flow field in order to achieve a resulting beneficial aerodynamic effect (e.g., improved lift or reduced drag). A typical scaling parameter for sizing flow control systems is called a coefficient of momentum (Cμ). The coefficient of momentum Cμ relates the momentum out of the flow control system to the momentum of the freestream flow. The coefficient of momentum Cμ is defined by equation (1) as follows:

$$c_\mu = \frac{\rho_{jet} u_{jet}^2 A_{jet}}{\frac{1}{2}\rho_\infty u_\infty^2 A_{reference}} = 2\frac{\dot{m}_{jet} u_{jet}}{\rho_\infty u_\infty^2 A_{reference}} \tag{1}$$

By invoking principals from gas dynamics, namely the ideal gas law and isentropic relations, the coefficient of momentum Cμ in equation (1) may be rewritten as equation (2) as follows:

$$c_\mu = 2\left(\frac{1 + \frac{\gamma-1}{2}M_{jet}^2}{1 + \frac{\gamma-1}{2}M_\infty^2}\right)^{-\frac{\gamma}{\gamma-1}} \left(\frac{M_{jet}}{M_\infty}\right)^2 \left(\frac{P_{0jet}}{P_{0\infty}}\right)\left(\frac{A_{jet}}{A_{ref}}\right) \tag{2}$$

The purpose of writing these relations is to illustrate some fundamental parameters that govern mass-flux-based adjustable flow control system design: the Mach number of the jet 122 compared to that of the freestream, the total pressure of the jet 122 compared to that of the freestream, and the area of the jet 122 compared to some fixed geometric reference area (e.g., a wing planform area). In concise mathematical terms, the coefficient of momentum Cμ may be expressed by equation (3) as follows:

$$C_\mu = \text{function}\left(\left(\frac{M_{jet}}{M_\infty}\right)^2, \frac{P_{0jet}}{P_{0\infty}}\right) \tag{3}$$

Where $M_{jet}$ is a Mach number of the jet 122, and $M_\infty$ is a Mach number of the freestream, $P_{0jet}$ is a pressure of the jet 122 and $P_{0\infty}$ is a pressure of the freestream. Allowing for a variable area ($A_{jet}$) of the mass-flow devices, the formulation of the coefficient of momentum Cμ may be given by equation (4) as follows:

$$C_\mu = \text{function}\left(\left(\frac{M_{jet}}{M_\infty}\right)^2, \frac{P_{0jet}}{P_{0\infty}}, \frac{A_{jet}}{A_{ref}}\right) \tag{4}$$

Where $A_{ref}$ is a reference area of the freestream, and $A_{jet}$ is a design variable by which to achieve a target momentum for a given flight condition that is available and may be adjusted in real time. The variability is an improvement because the Mach number ratio and the total pressure ratio are otherwise fixed once a current state-of-the-art flow control system has been sized and is operating at a given flight condition. The addition of the area ratio term permits a trade with other parameters that may efficiently operate the flow control system with respect to mass flow rate and pressure available from a fluid source. In such context, efficiency refers to the relative utilization of pressure versus mass flow rate. In applications where the air source is pressure limited, it is preferable to provide more mass flow rate and less pressure across the adjustable mass flow control system. In applications where the air source is mass flow rate limited, the opposite is true. Note that a given flow control system generally operates in a wide range of flight conditions, from takeoff (e.g., freestream Mach 0.2 at sea level) to cruise (e.g., freestream Mach 0.8 at 30,000 feet), to high-speed maneuver (e.g., freestream Mach 1.5 at 25,000 feet). Such disparate conditions make efficient operation challenging without the use of the adjustability described herein.

Figure 3:
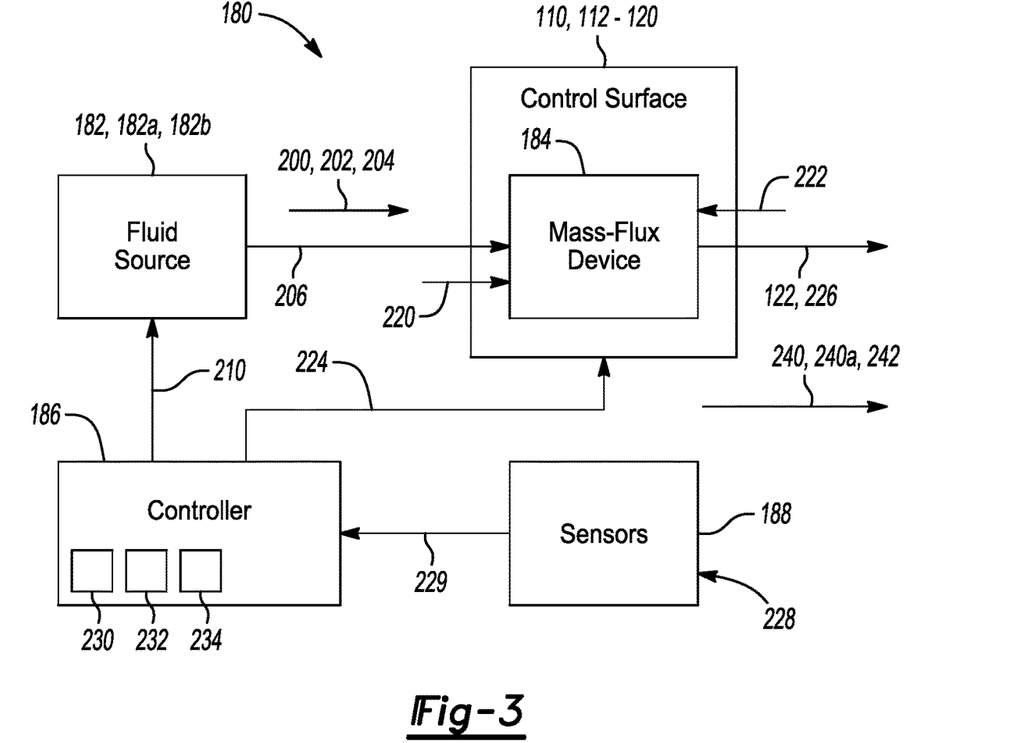
FIG. 3 is a schematic diagram of an adjustable flow control system in accordance with one or more exemplary embodiments.

Referring to FIG. 3, a schematic diagram of an example implementation of an adjustable flow control system 180 is shown in accordance with one or more exemplary embodiments. The adjustable flow control system 180 generally includes a fluid source 182, multiple mass-flux devices 184 (one shown), a controller 186, multiple sensors 188, multiple control surfaces 110 (one shown), and associated flight control surfaces 112-120 (see FIG. 1).

The fluid source 182 implements a compressor configured to generate a fluid flow 200. The fluid flow may be a gas (e.g., air) or a liquid (e.g., water). In various embodiments, the fluid source 182 may be a compressor 182a, an engine, or an auxiliary power unit 182b. Other types of fluid sources 182 may be implemented to meet the design criteria of a particular application.

The fluid flow 200 may be transferred from the fluid source 182 to the mass-flux devices 184. The fluid flow 200 is characterized by having an outlet pressure 202, an outlet temperature 204, and a mass flow rate 206. Control of the fluid flow 200 may be provided through a fluid source control signal 210.

Each mass-flux device 184 implements a variable flow control device. Each mass-flux device 184 receives the fluid flow 200 at an inlet 220, and presents a jet 122 at an outlet 222. Control of the jet 122 is provided by a mass-flux control signal 224. The mass-flux control signal 224 is configured to provide a variable momentum 226 in the jet 122 by adjusting an exit area of the outlet 222.

The controller 186 implements one or more processors. The controller 186 is configured to repeatedly calculate a particular exit area of the mass-flux devices 184 to achieve a flow performance metric 232 (e.g., a target momentum ratio 234) that accounts for changes in the operating conditions 228, calculate a fluid property 230 of the fluid flow 200 to produce the flow performance metric 232 based on the particular exit area, and determine if the fluid source 182 could generate the fluid flow 200 to match the fluid property 230 based on the particular exit area. If the fluid source 182 is able to generate the fluid flow 200 to match the fluid property 230 as calculated, the controller 186 is further configured to control a variable geometry of the exit area of the mass-flux devices 184 to establish the particular exit area as calculated. If the fluid source 182 is unable to generate the intended fluid flow 200, the controller 186 is configured to iterate the variable geometry of the exit area of the mass-flux device until the fluid source 182 is able to generate the intended fluid flow 200. Control of the fluid source 182 is achieved via the fluid source control signal 210. Control of the mass-flux devices 184 is provided through the mass-flux control signal 224. The operating conditions 228 are based on sensor data received by the controller 186 via sensor signals 229.

The controller 186 may implement one or more processors, memory, and associated input/output circuitry. In various embodiments, the memory may include non-transitory computer-readable memory that stores software. The software is executable by the processors in the controller 186. The controller 186 is operational to execute software that provides control of the fluid source 182 and the mass-flux devices 184 based on the current operating conditions 228.

The sensors 188 implement multiple types of sensors that determine the operating conditions 228 of the aircraft 100 (FIG. 1). The sensor data is presented in the sensor signals 229 to the controller 186. The sensors 188 may include, but are not limited to, an altimeter, a speed sensor, an air pressure sensor, and an air temperature sensor. Other types of sensors 188 may be implemented to meet a design criteria of a particular application.

The control surfaces 110 implement one or more of the flaps 112, the flaperons 114, the ailerons 116, the elevators 118, and/or the rudder 120. A freestream flow 240 generally moves around the control surfaces 110 in support of the aerodynamics of the aircraft 100. In various embodiments, the freestream flow 240 may be an air flow 240a. The freestream flow 240 may convey a freestream momentum 242.

Figure 4:
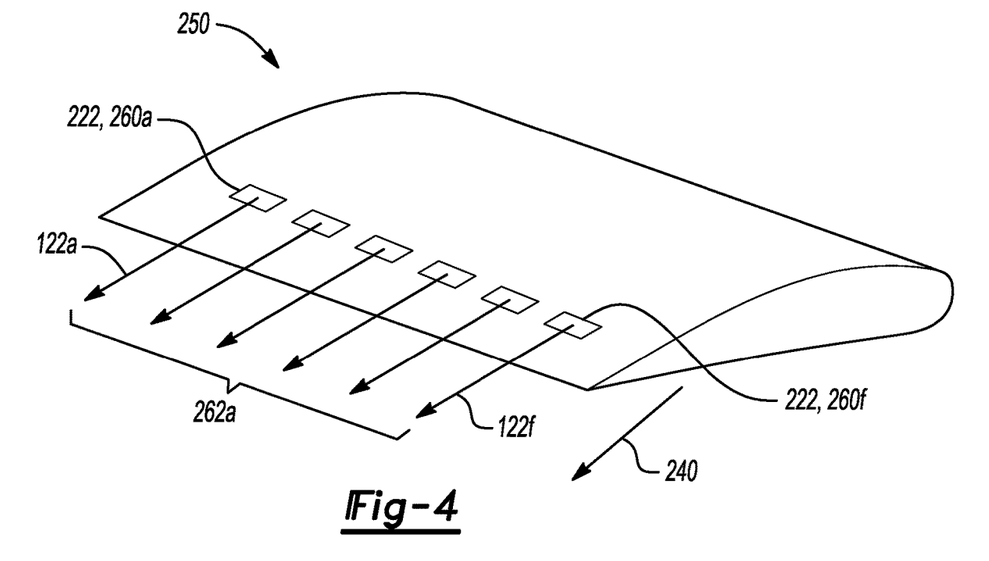
FIG. 4 is an isometric view diagram of a first configuration of multiple mass-flux devices on a control surface in accordance with one or more exemplary embodiments.

Referring to FIG. 4, an isometric view diagram of an example first configuration 250 of multiple mass-flux devices on a control surface 110 (e.g., a flap 112) is shown in accordance with one or more exemplary embodiments. The first configuration 250 may be referred to as a baseline configuration. In the example, the multiple mass-flux devices 184 (see FIG. 3) are illustrated as six mass-flux devices disposed inside the control surface 110. The mass-flux devices 184 have a number of corresponding outlets 222. Each outlet 222 has a respective exit area 260a-260f visible near a trailing edge of the control surface 110. A sum of the exit areas 260a-260f may be referred to as a total exit area 262a. The outlets 222 present respective jets 122a-122f. The freestream flow 240 blows from a leading edge of the control surface 110 to the trailing edge of the control surface 110. The freestream flow 240 and the jets 122a-122f flow in the same general direction. In the example baseline, the exit areas 260a-260f match each other in size.

Figure 5:
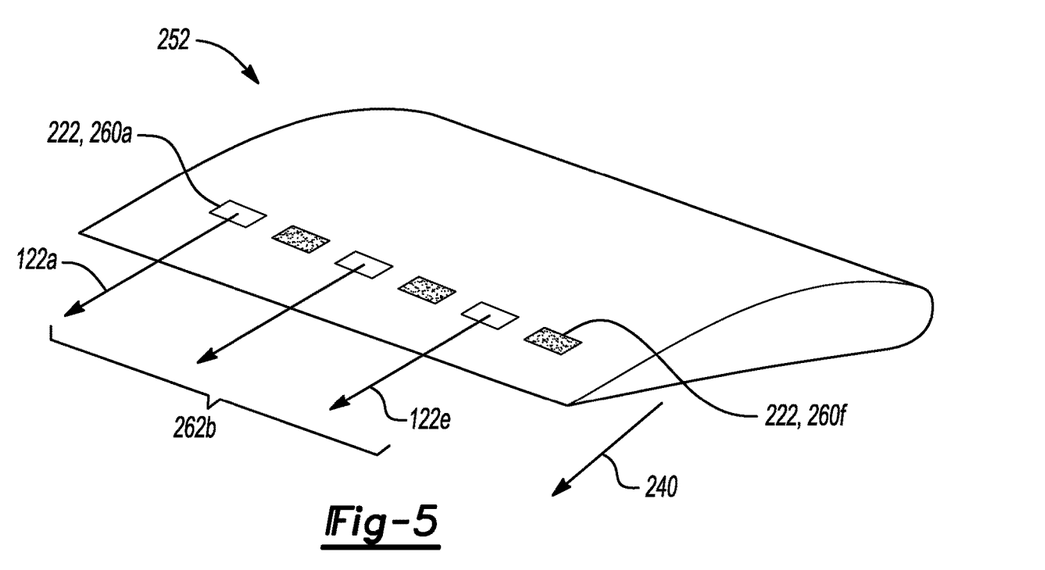
FIG. 5 is an isometric view diagram of a second configuration of the multiple mass-flux devices on the control surface in accordance with one or more exemplary embodiments.

Referring to FIG. 5, an isometric view diagram of an example second configuration 252 of the multiple mass-flux devices on the control surface 110 is shown in accordance with one or more exemplary embodiments. The exit areas 260a-260f of the mass-flux devices may be controlled individually. For example, one or more particular exit areas (e.g., 260b, 260d, and 260f) may be closed, while other particular exit areas (e.g., 260a, 260c, and 260e) are kept open. In the example, the exit areas 260b, 260d and 260f are shown blocked, thereby halving the total exit area 262a (FIG. 4) to a reduced total exit area 262b. The reduced total exit area 262b provides the jets 122a, 122c, and 122e flowing into the freestream flow 240. The blocking may be achieved through, for example: louvers, valves, plugs, flaps, etc. Various numbers of the mass-flux devices may be configured to be blocked or open.

Figure 6:
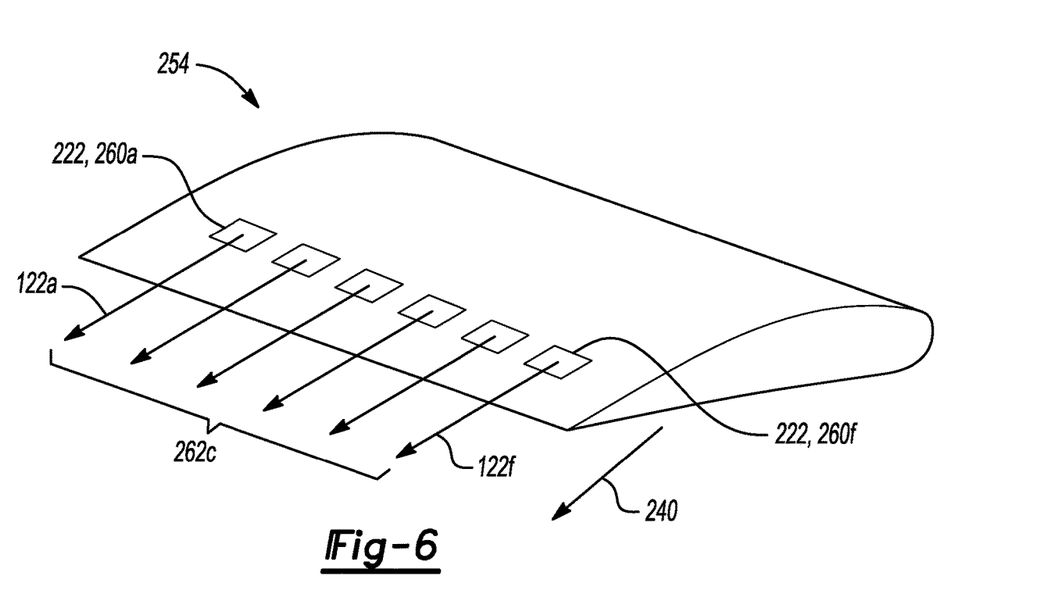
FIG. 6 is an isometric view diagram of a third configuration of the multiple mass-flux devices on the control surface in accordance with one or more exemplary embodiments.

Referring to FIG. 6, an isometric view diagram of an example third configuration 254 of the multiple mass-flux devices on the control surface 110 is shown in accordance with one or more exemplary embodiments. In the example, the exit areas 260a-260f of the mass-flux devices are adjusted to greater than (e.g., double) the baseline configuration shown in FIG. 4. The increased exit areas 260a-260f increase the baseline total exit area 262a to an enhanced total exit area 262c. The enhanced total exit area 262c results in more powerful jets 122a-122f mixing with the freestream flow 240. Various numbers of mass-flux devices may be configured to increase (FIG. 6) and/or decrease (FIG. 5) in area, and each mass-flux device is independently actuated.

Figure 7:
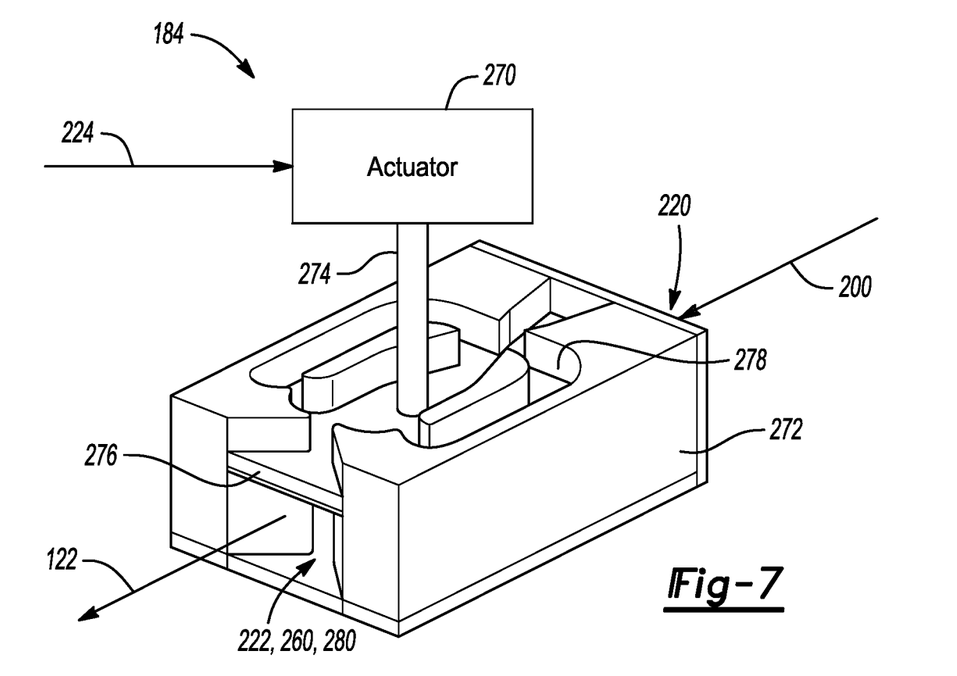
FIG. 7 is an isometric view diagram of a mass-flux device in accordance with one or more exemplary embodiments.

Referring to FIG. 7, an isometric view diagram of an example implementation of a mass-flux device 184 is shown in accordance with one or more exemplary embodiments. The mass-flux device 184 generally includes the inlet 220, the outlet 222, an actuator 270, a housing 272, a plunger 274, and a plunger wall 276. The housing 272 defines a cavity 278 and the plunger wall 276 moves linearly within the cavity 278. The mass-flux control signal 224 is received by the actuator 270. The fluid flow 200 is received at the inlet 220. The jet 122 is presented from the outlet 222. The outlet 222 defines an exit area 260 with a variable geometry 280.

The actuator 270 responds to the mass-flux control signal 224 by raising, lowering, or maintaining the plunger 274 at a current location within the cavity 278. The location of the plunger wall 276 establishes a variable geometry (or variable area) 280 (e.g., $A_{jet}$) that controls the fluid flow 200 from the inlet 220 to the outlet 222 and so controls the momentum of the jet 122. Additional details of the example implementation of the mass-flux device 184 may be found in U.S. Pat. No. 11,347,204, which is hereby incorporated by reference in its entirety.

Other example mechanizations for adjusting the exit area 260 may include converging nozzles with aperture-like closing; arrays that may close/open certain devices (louvers, sliding doors, plugs, valves, etc.); slot nozzles with variable geometry (height and/or width); and plunger-like height decreases in 2-dimensional extruded devices. The mass-flux device geometry changes may be driven by pneumatic, electro-mechanical, hydraulic, or shape-memory-alloy-based actuators.

Figure 8:
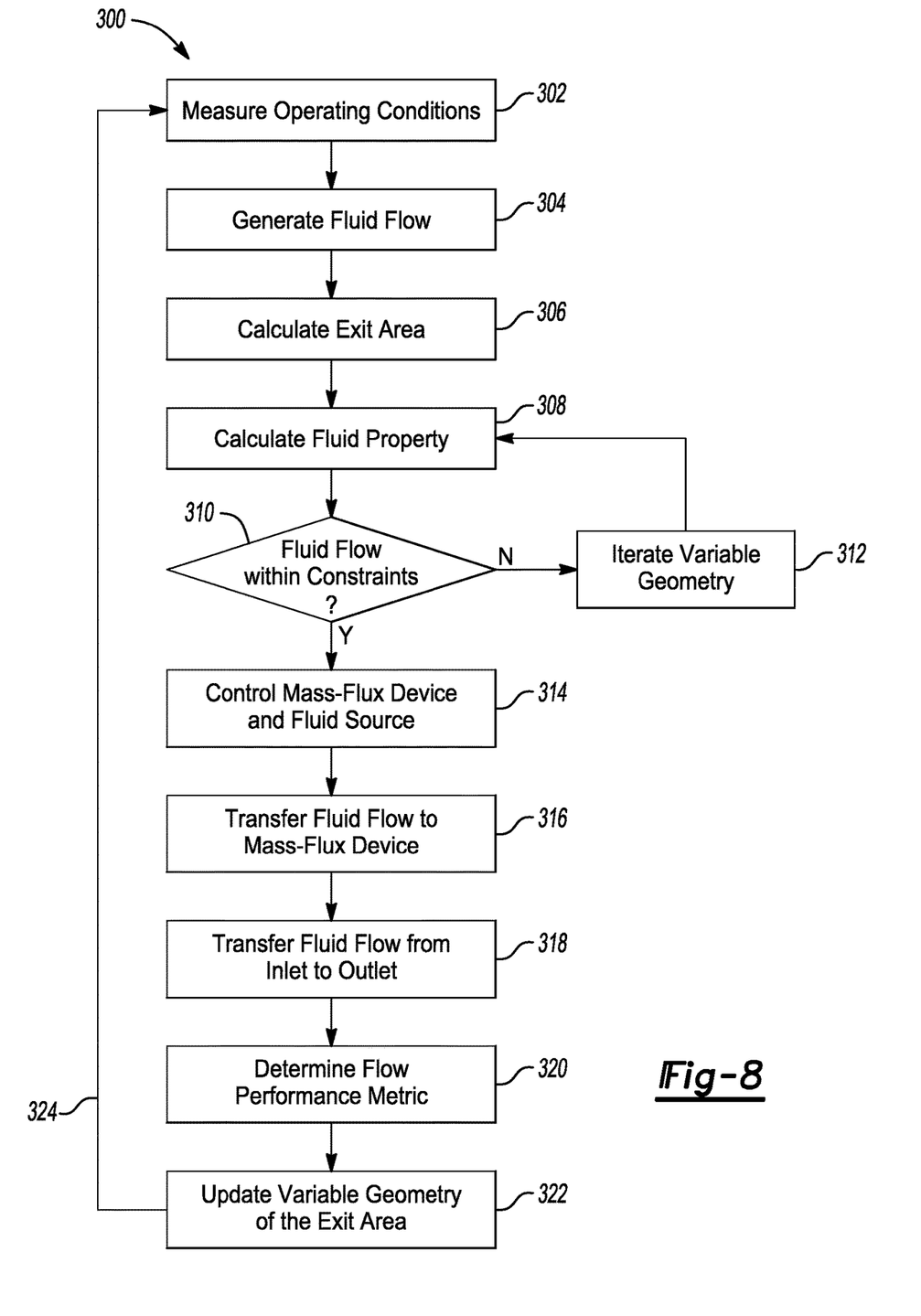
FIG. 8 is a flow diagram of a method for adjustable flow control in accordance with one or more exemplary embodiments.

Referring to FIG. 8, a flow diagram of an example method 300 for adjustable flow control is shown in accordance with one or more exemplary embodiments. The method (or process) 300 is implemented by the adjustable flow control system 180 as shown in FIGS. 3-6. The method 300 includes steps 302 to 324, as illustrated. The sequence of steps is shown as a representative example. Other step orders may be implemented to meet the criteria of a particular application.

The method 300 generally achieves a planned momentum ratio within the air source constraints while updating the exit areas 260a-260f of the mass-flux devices 184. The intended momentum ratio depends on the current flight conditions (e.g., flight Mach number, freestream pressure and temperature, etc.) and the desired aerodynamic change. The desired aerodynamic change may be modeled in real-time (e.g., low-order, computationally-efficient models) or determined from a lookup table based on pre-computed values.

In the step 302, the sensors 188 measure the operating conditions 228 and report the operating conditions 228 to the controller 186. Concurrently (or in parallel), the fluid source 182 may generate the fluid flow 200 in the step 304. The controller 186 calculates the particular exit areas 260a-260f of the mass-flux devices 184 in the step 306 to achieve a flow performance metric 232. The controller 186 also calculates the fluid property 230 of the fluid flow 200 to produce the flow performance metric 232 based on the particular exit areas 260a-260f in the step 308.

In the step 310, the controller 186 determines if the fluid source 182 may generate the fluid flow 200 to match the fluid property 230 based on the particular exit areas 260a-260f. If the fluid source 182 cannot generate an appropriate fluid flow 200, the controller 186 may iterate the variable geometry 280 (step 312) of the exit areas 260a-260f and update the resulting fluid property 230 until the fluid source 182 is capable of generating the fluid flow 200 to match the fluid property 230.

Once the fluid property 230 is achievable, the controller 186 may control the mass-flux devices 184 and the fluid source 182 in the step 314 to establish the intended fluid flow 200. The fluid flow 200 may be transferred from the fluid source 182 to the inlets 220 of the mass-flux devices 184 in the step 316. The mass-flux devices 184 subsequently transfer the fluid flow 200 from the inlets 220 to the outlets 222 in the step 318.

In the step 320, the controller 186 may re-determine the flow performance metric 232 at a new current time to account for one or more changes in the operating conditions 228. The new flow performance metric 232 may result in the controller 186 updating the variable geometry 280 of the exit areas 260a-260f of the mass-flux devices 184 in the step 322 in response to the one or more changes in the operating conditions 228. In the step 324, the method 300 may loop back to the step 302 and repeat the process.

Figure 9:
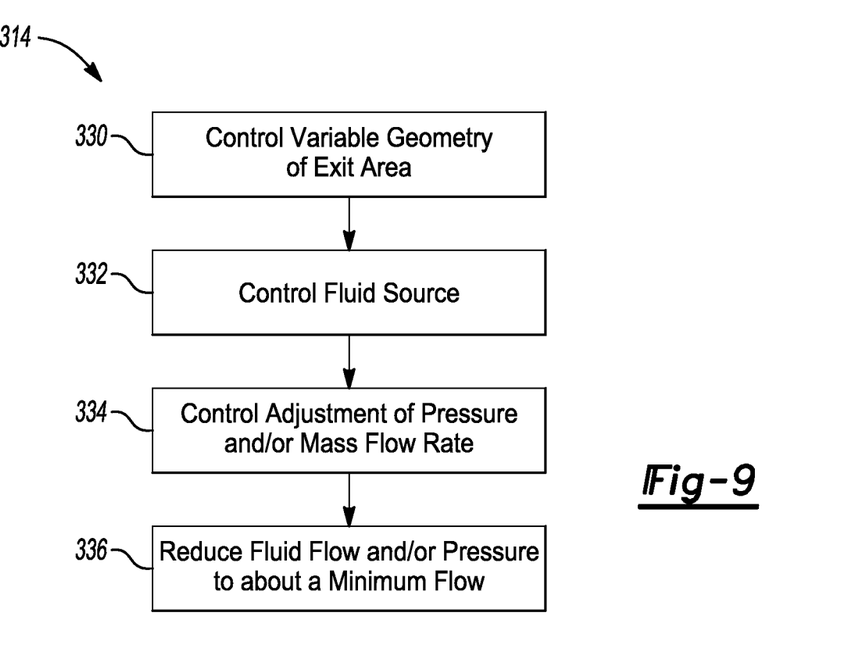
FIG. 9 is a flow diagram of a controlling step in the method of FIG. 8 in accordance with one or more exemplary embodiments.

Referring to FIG. 9, a flow diagram of an example implementation of the controlling step 314 is shown in accordance with one or more exemplary embodiments. The controlling step 314 may include steps 330 to 336, as illustrated. The sequence of steps is shown as a representative example. Other step orders may be implemented to meet the criteria of a particular application.

In the step 330, the controller 186 controls the variable geometry 280 of the mass-flux devices 184 to establish the particular exit area 260a-260f as calculated in response to the fluid source 182 being able to generate the fluid flow 200 to match the calculated fluid property 230. The controller 186 subsequently controls the fluid source 182 in the step 332 to produce the fluid flow 200 with the calculated fluid property 230. The control may include controlling the fluid source 182 in the step 334 to adjust one or more of the outlet pressure 202 and/or the mass flow rate 206 of the fluid flow 200 to produce the flow performance metric 232. The adjustments generally reduce the fluid flow 200 from the fluid source 182 to the mass-flux devices 184 to approximately a minimum (or low) flow or pressure while the mass-flux devices 184 operate at the particular exit areas 260a-260f to produce the flow performance metric 232 in the step 336. While the nozzle is not choked, pressure and mass-flow rate may be traded to achieve an intended momentum.

Embodiments of the adjustable flow control system 180 incorporate variable-geometry mass-flux devices 184 that are dynamically modulated such that input flow criteria are minimized to achieve a target momentum output over a broad range of flight conditions. The target momentum is achieved efficiently by varying the exit area of the mass-flux devices 184 (e.g., varying the area ratio of the mass-flux devices 184 relative to the control surfaces 110.) In the example of the oversized system for the given flight condition, the total exit area presented by the mass-flux devices 184 may be reduced. In the example of the undersized system, the total exit area may be increased.

Changes in the total exit areas are controlled to achieve an efficiency metric relative to operations of the fluid source 182. The variable geometry changes are predetermined based on the flight conditions (e.g., via a look-up table considering the current freestream conditions and the fluid source capabilities.) The flight conditions are determined from various sensors 188. For example, in an aircraft 100 with an auxiliary power unit 182b as the fluid source 182, instrumentation may include aircraft pitot-static probes, thermocouples, pressure transducers, and mass flow meters. The desired mass-flux device area changes are also determined in real-time based on deriving the total jet area suitable for the current freestream conditions, the desired target momentum, and the fluid source capability. The calculations may be executed by an onboard computer (e.g., the controller 186) driven by control criteria that link targeted aerodynamic benefits, coefficient of momentum, the described flight condition measurements, and the subsequent exit areas. The exit areas are based in part on empirical formulations of the fluid performance (e.g., mass flow rate versus pressure ratio curves) of the mass-flux devices 184

The benefits to the efficiency of the adjustable flow control system 180 cascade to the benefits of platforms that utilizes adjustable flow control. Additionally, adjustable flow control system 180 opens up the range of operability in meeting a target momentum (and hence aerodynamic benefit) across various flight conditions. The adjustable flow control system 180 provides improved performance for active flow control systems and hence overall improvement to aircraft design and performance. In particular, better/identical aerodynamic/thermodynamic/fluid dynamic performances may be achieved for identical/less fluid power costs.

Cost savings and cost avoidance are possible as the adjustable flow control system 180 expands the feasible design space and hence performance of new aircraft, as well as improve the performance of existing aircraft. For example, conceptual studies have shown that implementation of a flow control system on the order of 100 pounds in weight may improve a lift-to-drag ratio by approximately 6% at takeoff for a commercial passenger airplane. In another example, the adjustable flow control system 180 may implement primary control effectors in flight envelope ranges between Mach 0.1 to Mach 0.7, altitude 0 feet to 20,000 feet, and/or a range of available pressure and/or mass flow rates from an auxiliary power unit.

This disclosure is susceptible of embodiments in many different forms. Representative embodiments of the disclosure are shown in the drawings and are herein described in detail with the understanding that these embodiments are provided as an exemplification of the disclosed principles, not limitations of the broad aspects of the disclosure. To that extent, elements and limitations that are described, for example, in the Abstract, Background, Summary, and Detailed Description sections, but not explicitly set forth in the claims, should not be incorporated into the claims, singly or collectively, by implication, inference or otherwise.

For purposes of the present detailed description, unless specifically disclaimed, the singular includes the plural and vice versa. The words "and" and "or" shall be both conjunctive and disjunctive. The words "any" and "all" shall both mean "any and all," and the words "including," "containing," "comprising," "having," and the like shall each mean "including without limitation." Moreover, words of approximation such as "about," "almost," "substantially," "approximately," and "generally," may be used herein in the sense of "at, near, or nearly at," or "within 0-5% of," or "within acceptable manufacturing tolerances," or other logical combinations thereof. Referring to the drawings, wherein like reference numbers refer to like components.

The detailed description and the drawings or FIGS. are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment may be combined with one or a plurality of other desired characteristics from other embodiments, resulting in other embodiments not described in words or by reference to the drawings. Accordingly, such other embodiments fall within the framework of the scope of the appended claims.

What is claimed is:

1. An adjustable flow control system comprising:
   a fluid source configured to generate a fluid flow;
   a mass-flux device with an inlet and an outlet, wherein the inlet is in fluid communication with the fluid source to receive the fluid flow, the fluid flow is transferred from the inlet to the outlet, and the outlet has an exit area with a variable geometry; and
   a controller configured to:
      calculate a first particular exit area of the mass-flux device to achieve a flow performance metric;
      calculate a fluid property of the fluid flow to produce the flow performance metric based on the first particular exit area;
      after determining that the fluid source is unable to generate the fluid flow to match the fluid property based on the first particular exit area, calculate a second particular exit area of the mass-flux device to achieve the flow performance metric; and
      after determining that the fluid source is able to generate the fluid flow to match the fluid property based on the second particular exit area, control the variable geometry of the exit area of the mass-flux device to establish the second particular exit area.

2. The adjustable flow control system according to claim 1, wherein the controller is further configured to control the fluid source to produce the fluid flow with the fluid property as calculated.

3. The adjustable flow control system according to claim 1, wherein the fluid flow from the fluid source to the mass-flux device is reduced to approximately a minimum flow while the mass-flux device operates at the second particular exit area to produce the flow performance metric.

4. The adjustable flow control system according to claim 1, wherein the controller is further configured to control the fluid source to adjust one or more of a pressure and a mass flow rate of the fluid flow to produce the flow performance metric.

5. The adjustable flow control system according to claim 1, further comprising a plurality of sensors configured to measure a plurality of operating conditions.

6. The adjustable flow control system according to claim 5, wherein the controller is further configured to:
   determine the flow performance metric repeatedly in time to account for one or more changes in the plurality of operating conditions; and
   update the variable geometry of the exit area of the mass-flux device in response to the one or more changes in the plurality of operating conditions.

7. The adjustable flow control system according to claim 1, wherein the controller is further configured to iterate the variable geometry of the exit area of the mass-flux device in response to the fluid source being unable to generate the fluid flow to match the fluid property based on the first particular exit area.

8. The adjustable flow control system according to claim 1, wherein the flow performance metric is a target momentum ratio of (i) a variable momentum of the fluid flow presented from the outlet of the mass-flux device to (ii) a freestream momentum of a freestream flow proximate the mass-flux device.

9. The adjustable flow control system according to claim 1, wherein:

the mass-flux device is a plurality of mass-flux devices with a plurality of exit areas;

the plurality of exit areas form a total exit area; and the control of the variable geometry is a combined control of the total exit area.

10. The adjustable flow control system according to claim 9, wherein the combined control of the total exit area changes the plurality of exit areas to a plurality of different exit areas.

11. A method for adjustable flow control comprising:

generating a fluid flow with a fluid source;

transferring the fluid flow from an inlet to an outlet of a mass-flux device, wherein the outlet has an exit area with a variable geometry; and calculating a first particular exit area of the mass-flux device to achieve a flow performance metric;

calculating a fluid property of the fluid flow to produce the flow performance metric based on the first particular exit area;

after determining that the fluid source is unable to generate the fluid flow to match the fluid property based on the first particular exit area, calculating a second particular exit area of the mass-flux device to achieve the flow performance metric; and after determining that the fluid source is able to generate the fluid flow to match the fluid property based on the second particular exit area, controlling the variable geometry of the exit area of the mass-flux device to establish the second particular exit area.

12. The method according to claim 11, further comprising:

controlling the fluid source to produce the fluid flow with the fluid property as calculated.

13. The method according to claim 11, further comprising:

reducing the fluid flow from the fluid source to the mass-flux device to approximately a minimum flow while the mass-flux device operates at the second particular exit area to produce the flow performance metric.

14. The method according to claim 11, further comprising:

controlling the fluid source to adjust one or more of a pressure and a mass flow rate of the fluid flow to produce the flow performance metric.

15. The method according to claim 11, further comprising:

measuring a plurality of operating conditions with a plurality of sensors.

16. The method according to claim 15, further comprising:

determining the flow performance metric repeatedly in time to account for one or more changes in the plurality of operating conditions; and updating the variable geometry of the exit area of the mass-flux device in response to the one or more changes in the plurality of operating conditions.

17. The method according to claim 11, further comprising:

iterating the variable geometry of the exit area of the mass-flux device in response to the fluid source being unable to generate the fluid flow to match the fluid property based on the first particular exit area.

18. The method according to claim 11, wherein the flow performance metric is a target momentum ratio of (i) a variable momentum of the fluid flow presented from the outlet of the mass-flux device to (ii) a freestream momentum of a freestream flow proximate the mass-flux device.

19. The method according to claim 11, wherein:

the mass-flux device is a plurality of mass-flux devices with a plurality of exit areas;

the plurality of exit areas form a total exit area; and the controlling of the variable geometry is a combined controlling of the total exit area.

20. An aircraft comprising:

a flight control surface;

a plurality of sensors configured to measure a plurality of operating conditions of the aircraft;

a fluid source configured to generate a fluid flow;

a mass-flux device with an inlet and an outlet, wherein the inlet is in fluid communication with the fluid source to receive the fluid flow, the fluid flow is transferred from the inlet to the outlet, and the outlet has an exit area with a variable geometry disposed proximate the flight control surface; and a controller configured to:

calculate a first particular exit area of the mass-flux device to achieve a flow performance metric in response to the plurality of operating conditions;

calculate a fluid property of the fluid flow to produce the flow performance metric based on the first particular exit area;

after determining that the fluid source is unable to generate the fluid flow to match the fluid property based on the first particular exit area, calculate a second particular exit area of the mass-flux device to achieve the flow performance metric; and after determining that the fluid source is able to generate the fluid flow to match the fluid property based on the second particular exit area, control the variable geometry of the exit area of the mass-flux device to establish the second particular exit area.

* * * * *